3,803,106
PROCESS FOR PREPARING A COPOLYMER OF ETHYLENE AND A CONJUGATED DIENE
Kiyoshige Hayashi, Tokyo, and Akihiro Kawasaki and Isao Maruyama, Ichihara, Japan, assignors to Maruzen Petrochemical Co., Ltd., Tokyo, Japan
Filed Mar. 15, 1971, Ser. No. 124,281
Claims priority, application Japan, Mar. 19, 1970, 45/22,676; Apr. 13, 1970, 45/30,761
Int. Cl. C08d 1/14, 3/06, 3/10
U.S. Cl. 260—85.3 R          19 Claims

ABSTRACT OF THE DISCLOSURE

An alternating copolymer and/or an ethylene rich random copolymer of ethylene and a conjugated diene is formed by reaction in the presence of a catalyst comprising an organoaluminum compound and a titanium tetrahalide. The characteristic feature of the alternating copolymer is that the configuration of the conjugated diene units in the copolymer is not stereospecific and the copolymer shows rubber-like elasticity. The random copolymer has no diene-diene linkage.

BACKGROUND OF THE INVENTION

(1) Field of the invention

The present invention relates to a novel alternating copolymer of conjugated diene and ethylene whose microstructure of conjugated diene is lacking in stereospecificity. The alternating copolymer of conjugated diene and ethylene shows rubber-like elasticity.

The present invention further relates to a process for preparing a copolymer of conjugated diene and ethylene, and more particularly, relates to a process for preparing an alternating copolymer of conjugated diene and ethylene whose microstructure of conjugated diene units is lacking in stereospecificity and an ethylene rich random copolymer of conjugated diene and ethylene at the same time. The ratio of the alternating copolymer to the random copolymer in the reaction product can be varied widely by controlling the polymerization conditions. At the ultimate conditions, the former or latter copolymer alone can be prepared.

(2) Description of the prior act

British Pat. 776,326 (1957), U.S. Pat. 2,968,650 (1961) and German Pat. 1,144,924 (1963) reported a process for preparing a copolymer of ethylene and butadiene by using a catalyst system of titanium (IV) chloride and phenyl magnesium bromide, a process for preparing a copolymer of ethylene and butadiene by using a catalyst system of titanium (IV) chloride and lithium aluminum hydride and a process for preparing a copolymer of ethylene and isoprene by using a catalyst system of titanium (IV) chloride and lithium aluminum tetrabutyl. These copolymers were shown to be polyethylene modified by 10–20% butadiene or by a minor amount of isoprene units. British Pat. 893,462 (1962) and U.S. Pat. 3,244,678 (1966) described the process for preparing a copolymer of ethylene and isoprene by using a coordination catalyst system composed of triisobutylaluminum and vanadyl chloride. The ethylene unit content of the copolymer was in the range of 99% to 90% by weight. The microstructure of isoprene unit of the copolymer was 1,2 and 3,4-structures. The patents also described that the copolymer may be in the form of block copolymer, graft copolymer or random copolymer. On the other hand, Suminoe (Kobunshi Kagaku, 20, 467 (1963), Kobunshi Gakkai, Tokyo, Japan) reported a copolymerization reaction of ethylene and isoprene in the presence of triethylaluminum-titanium (IV) chloride catalyst system. The copolymerization reaction was carried out by introducing a gaseous mixture of ethylene and nitrogen at a predetermined rate into a n-hexane solution of isoprene and catalyst system at the temperature of an ice-water system and at atmospheric pressure. The copolymer was fractionated into 2 fractions by benzene extraction, however both fractions were determined to be block-type copolymers.

Belgian Pats. 625,657 (1963), and 625,658 (1963), Japanese patent publications 14,813/1964, and 14,814/1964 and Italian Pat. 664,769 (1964) described that linear vulcanizable copolymers of conjugated diolefins and ethylene were produced by using a catalyst system containing a hydrocarbon soluble vanadium compound, such as a halide, oxyhalide, alkoxide or acetyl-acetonate, e.g. vanadium (IV) chloride, vanadium (III) chloride or vanadium (IV) bromide and an organoaluminum compound containing at least one organic group having strong sterical hindrance, e.g. 3-methyl-butyl, cycloalkyl or cyclopentylmethyl. At least one valency of vanadium and (or) aluminum of the catalyst system was also saturated by a halogen atom. The copolymers obtained were determined to be completely amorphous from X-ray examinations. The patents also described that the distribution of unsaturated units in the copolymers is more homogeneous than that of the one prepared by any previous methods. Therefore, the copolymer is considered to be a random copolymer of a conjugated diolefin ethylene.

British Pat. 1,112,698 (1968) and Japanese patent publication 11,303/1970 described processes for preparing an unsaturated, crsytalline copolymer comprising macromolecules made up of copolymerized units of ethylene and butadiene in which the butadiene units have an essentially trans-1,4 structure and containing from 0.1 to 5 mol percent butadiene, which copolymers do not exhibit crystallinity typical of butadiene units of trans-1,4 type by using a catalyst consisting of the reaction product of a complex having the formula $TiCl_4 \cdot 2PR_3$ wherein R is an aryl, radical, with an aluminum dialkyl monochloride. Boiling n-heptane insoluble fraction of the copolymer showed, under X-ray, high crystallinity of polyethylene type, while the infrared spectrum showed unsaturation of trans-type. The copolymer was determined to be a random copolymer of ethylene and butadiene having homogeneous distribution of unsaturated units.

French Pats. 1,302,656 (1962) and 1,334,941 reported the processes for preparing copolymers of ethylene and butadiene having a low content of butadiene unit by using a catalyst system of triethylaluminum or diethylaluminum monochloride, vanadium (IV) chloride and trichloroacetic acid. The copolymer is considered to be a linear polyethylene modified by small amounts of butadiene unsaturation.

Japanese patent publication 17,144/1969 also described a process for preparing a random copolymer of ethylene and butadiene having a low content of butadiene unit by using titanium (IV) chloride, diethylaluminum monochloride and a tertiary diphosphine compound.

At any rate, there are shown no descriptions with respect to any alternating copolymer of conjugated diene and ethylene and the process for preparing the alternating copolymer in the above references.

Natta (Makromol. Chem. 79, 161 (1964)) reported that a copolymer of butadiene and ethylene was prepared at −25° C. by using a catalyst system of triisobutylaluminum, diisobutylaluminum monochloride, anisol and vanadium (IV) chloride mixed at −78° C. 1.20% of the crude copolymer was a n-pentane soluble and diethyl ether insoluble fraction. The fraction was crystalline and it's X-ray diagram showed the presence of peaks at angles $2\sigma=20.3$ and $23°$. The mol percent of ethylene unit in the fraction was 50.6% and its intrinsic viscosity was 0.25 (dl./g.). The melting point of the fraction was 60–65° C. The infrared spectrum of the copolymer showed crystallization sensitive bands at 1206, 1070 and 889 cm.$^{-1}$. On the other hand, although the microstructure of butadiene unit of the fraction was essentially trans-1,4, bands attributable to crystalline trans-1,4 polybutadiene could not be detected at 1235, 1054 and 773 cm.$^{-1}$. From the above results, the fraction was determined to be an alternating copolymer.

French Pat. 1,361,801 (1964) reported a crystalline copolymer of butadiene and ethylene having two peaks at 20.5° and 23.2° in the X-ray diagram and showing three bands at 8.27, 9.25 and 11.20 microns in the IR spectrum and the method for preparing the copolymer by a catalyst system of vanadium (IV) chloride, trialkylaluminum, dialkylaluminum monochloride and anisol.

Miyoshi (21st Annual Meeting of Japan Chemical Society, Tokoyo, 1968) also reported an alternating copolymerization of butadiene and ethylene. When the feeding rate of gaseous monomers was high, a catalyst system of titanium (IV) chloride, triethylaluminum and diethylaluminum monochloride produced a mixture of polyethylene and polybutadiene, on the other hand, when the feeding rate was low, the catalyst system produced a crystalline-alternating copolymer of butadiene and ethylene. The alternating copolymer was separated from the reaction product as a benzene soluble fraction. The molecular weight of the alternating copolymer was 2,000–3,000 and its melting point was at 60° C.

SUMMARY OF THE INVENTION

In accordance with this invention, we have found that by using the catalyst system composed of the first component of an organoaluminum compound having the general formula of $AlR_3$ wherein R represents a hydrocarbon radical selected from the group consisting of a $C_1$–$C_{12}$, preferably $C_1$–$C_8$, and more preferably $C_1$–$C_6$, alkyl, cycloalkyl, aryl and aralkyl radicals and the second component of titanium (IV) halide having the general formula of $TiX_4$ (wherein X represents halogen, hereinafter the same) or by using the catalyst system composed of the first component of an organoaluminum compound having the general formula of $AlR_3$ wherein R is as defined above, the second component of titanium (IV) halide having the general formula of $TiX_4$ (wherein X is the same as that defined above) and the third component of a carbonyl group containing compound, high molecular weight alternating copolymers of conjugated diene and ethylene whose microstructure of conjugated diene is lacking in stereoregularity and high molecular weight ethylene rich random copolymers of conjugated diene and ethylene can be prepared at the same time. The ratio of the alternating copolymer to the random copolymer in the reaction product can be varied widely by controlling the polymerization conditions. For example, by decreasing the molar ratio of conjugated diene to ethylene in the initial monomer composition, the ratio of the alternating copolymer to the random copolymer in the reaction product decreases and vice versa. Also, the ratio changes in accordance with the selection of the catalyst system employed. To obtain a high ratio of alternating copolymer to random copolymer in the reaction product, it is also necessary to conduct the polymerization reaction at mild conditions. At the ultimate conditions, the former or the latter copolymer alone can be prepared.

The alternating copolymer of conjugated diene and ethylene can be separated from the ethylene rich random copolymer of the conjugated diene and ethylene by usual solvent extraction methods. For example, the alternating copolymer is soluble in chloroform, n-heptane, toluene, diethyl ether, etc.; on the other hand, an ethylene rich random copolymer of conjugated diene and ethylene is insoluble in the above solvents.

The alternating copolymers of conjugated diene and ethylene of the present invention are rubber-like in character and can be used as polymeric plasticizers, in adhesives and can be vulcanized with sulphur or a sulphur compound to produce vulcanized elastomers. The ethylene rich random copolymers of conjugated diene and ethylene are also useful because by vulcanization with sulphur based mixes they can be transformed into products having mechanical properties. By adding predetermined amounts of rubber-like alternating copolymer of conjugated diene and ethylene into an ethylene rich random copolymer of conjugated diene and ethylene, the mechanical properties of the random copolymer also can be modified.

The organoaluminum compounds which form the first component of the catalyst system of this invention are defined by the formula $AlR_3$ wherein R is a hydrocarbon radical selected from the group consisting of a $C_1$–$C_{12}$, preferably $C_1$–$C_8$, and more preferably $C_1$–$C_6$, alkyl, cycloalkyl, aryl and aralkyl radicals. Mixtures of these organoaluminum compounds may also be employed. Examples of organoaluminum compounds falling within the definition include the following: trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl di-p-tolylaluminum, ethyldibenzylaluminum, diethylphenylaluminum, diethyl-p-tolylaluminum, diethylbenzylaluminum and the like. Mixtures of these compounds may also be employed. Of these, it is usually preferred to employ trialkylaluminum compounds.

The carbonyl group containing compounds which form the third component of the catalyst system of this invention are carbon dioxide, aldehyde, ketoaldehyde, ketone, carboxylic acid, keto-carboxylic acid, oxy-carboxylic acid, carboxylic acid halide, keto-carboxylic acid halide, oxy-carboxylic acid halide, carboxylic acid anhydride, keto-carboxylic acid anhydride, oxy-carboxylic acid anhydride, salt of carboxylic acid, salt of keto-carboxylic acid, salt of oxy-carboxylic acid, ester of carboxylic acid, ester of keto-carboxylic acid, ester of oxy-carboxylic acid, carbonyl halide, carbonate, carbonic ester, lactone, ketene, quinone, acyl peroxide, metal complex involving carbonyl group, acid amide, acid imide, isocyanate, aminoacid, urein, ureide, salt of carbamic acid, ester of carbamic acid, ureide acid, etc. Mixtures of these compounds may also be employed.

The components of the catalyst system are normally employed in catalytic quantities. In the preferred embodiment, the molar ratio of organoaluminum compound which forms the first component of the catalyst system of the present invention to titanium (IV) halide which forms the second component of the catalyst system should be higher than 1.0 (Al/Ti>1.0) and preferably the ratio should be higher than 1.5 (Al/Ti>1.5).

In the preferred embodiment, the molar ratio of carbonyl group containing compound which forms the third component of the catalyst system of this invention to titanium (IV) halide which forms the second component of the catalyst system of this invention should be in the range of 0.01 to 20 (0.01<C=O/Ti<20), the optimum ratios will be found between 0.02 and 10

$$(0.02 < C{=}O/Ti < 10)$$

In the present invention, the activity of the three components catalyst system of an organoaluminum compound having the general formula of $AlR_3$, titanium (IV) halide and a carbonyl group containing compound is higher than that of the two components catalyst system of an organoaluminum compound having the general formula of $AlR_3$ and titanium (IV) halide.

The conjugated dienes to be used in the present invention have from 4 to 12 carbon atoms, and typical examples are butadiene, pentadiene-1,3, hexadiene-1,3, isoprene, 2-ethyl butadiene, 2-propyl butadiene, 2-isopropyl butadiene, 2,3-dimethyl butadiene, phenyl butadiene and the like. Among them, butadiene and isoprene are preferable. A mixture thereof may also be employed.

The process for preparing the catalyst system of this invention has not been found to be critical. The organoaluminum compound which forms the first component of the catalyst system and titanuim (IV) halide which forms the second component of the catalyst system or the organoaluminum compound, titanium (IV) halide and the carbonyl group containing compound which forms the third component of the catalyst system of the present invention can, be mixed per se or they may be dissolved in some organic solvents. If a solvent is to be employed, the aromatic solvent such as benzene, toluene, xylene and the like; the aliphatic hydrocarbon, e.g. propane, butane, pentane, hexane, heptane, cyclohexane and the like; the halogenated hydrocarbon solvent such as trihaloethane, methylene halide, tetrahaloethylene and the like, are usually preferred. In general, the temperature at which the components of the catalyst system may be mixed covers a very wide range from $-100°$ C. to $+100°$ C., preferably from $-78°$ to $+50°$ C.

Polymerization temperature may be from $-100°$ C. to $+100°$ C., preferably from $-78°$ C. to $+50°$ C.

The practice of this copolymerization is usually carried out in the presence of an organic solvent or diluent. However, this does not mean that this invention cannot be practiced by employing bulk polymerization, i.e. without the use of solvent. If it is desired to use a solvent, the aromatic solvent such as benzene, toluene, xylene and the like; the aliphatic hydrocarbon, e.g. propane, butane, pentane, hexane, heptane, cyclohexane and the like; halogenated hydrocarbon solvent such as trihaloethane, methylene halide, trihaloethylene and the like are preferred.

At the completion of the copolymerization, the products may be precipitated and deashed by using a methanol-hydrochloric acid mixture. The precipitated product may further be washed with methanol for several times and dried under vacuum. As occasion demands, ethylene rich random copolymer of conjugated diene and ethylene is removed from the precipitated product by usual solvent extraction methods. The alternating copolymer of conjugated diene and ethylene of the present invention is soluble in chloroform, n-heptane, toluene, diethyl ether, etc.; on the other hand an ethylene rich random copolymer of conjugated diene and ethylene is insoluble in the above solvents.

The following results support the conclusion that the copolymer of butadiene and ethylene obtained by the present invention is an alternating one.

Figure 1:
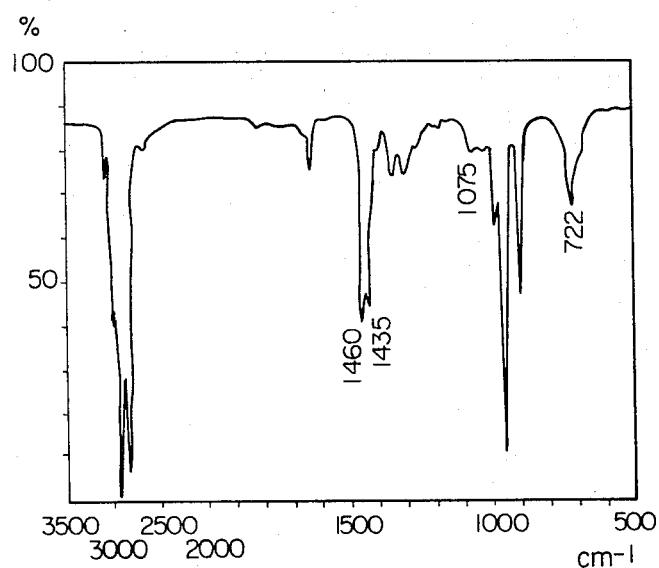
FIG. 1 shows the infrared spectrum of a solid film of an alternating copolymer of butadiene and ethylene of the present invention on rock salt, intrinsic viscosity thereof was found to be 2.38 (dl./g.) in toluene at 30° C., and its melting point was found to be 23° C. by DSC measurement.

(1) In FIG. 1, it is found that microstructure of butadiene units of the copolymer is composed of trans-1,4, cis-1,4 and 1,2 configurations and moreover it is rich in trans-1,4. The band ascribed to cis-1,4 butadiene units, the one ascribed to ethylene units and the one ascribed to main chain methylene group of 1,2-butadiene units may be overlapped at the broad absorption which appeared at 722 cm.$^{-1}$. From the shape of the 722 cm.$^{-1}$ band, it is possible to confirm the existence of cis-1,4 configuration, but it is impossible to measure it.

Figure 2:
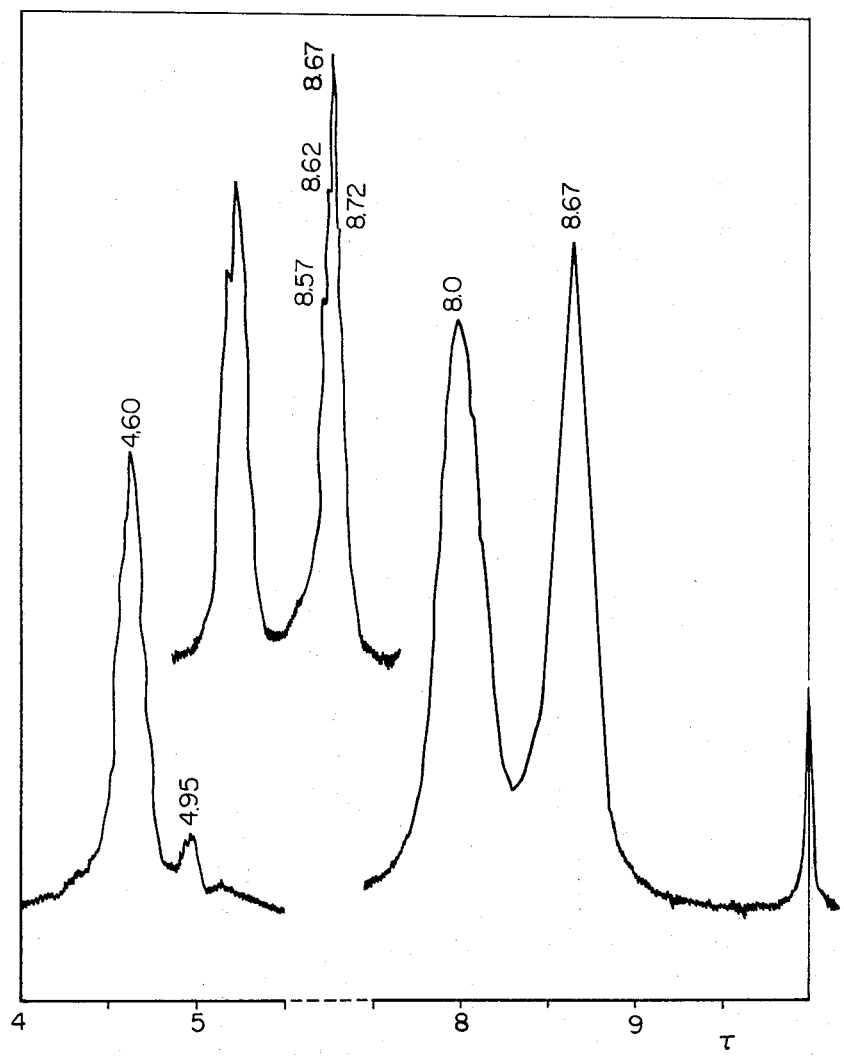
FIG. 2 shows the 60 mHz. nuclear magnetic resonance spectrum of the copolymer employed in FIG. 1 and the spectrum shown shifted upward is the 100 mHz. nuclear magnetic resonance spectrum of the copolymer.

(2) In FIG. 2, the 4.60τ peak is ascribed to overlapping of the two protons directly attached to the double bond of a 1,4-structure butadiene unit and a methine proton of a pendant vinyl group of a 1,2 butadiene unit. The 4.95τ peak is ascribed to methylene protons of pendant vinyl group of a 1,2 butadiene unit. The ratio of 1,4 structure of a butadiene unit to that of a 1,2 structure was determined as follows: if A is peak area of a 4.60τ peak and B is peak area of a 4.95τ peak, the molar ratio of a 1,4 structure to 1,2 structure can be shown by the following equation;

$$\frac{1,4 \text{ structure}}{1,2 \text{ structure}} = \frac{A - \frac{1}{2}B}{B}$$

Therefore, microstructure of the copolymer shown in FIG. 2 is as follows:

| | Percent |
|---|---|
| 1,4 structure | 85.3 |
| 1,2 structure | 14.7 |

(3) The molar ratio of a butadiene unit to ethylene unit was determined as follows: if C is the peak area of all the peaks appearing in the region from 7.5τ to 9.5τ, the molar ratio can be shown by the following equation, $$\frac{\text{butadiene}}{\text{ethylene}} = \frac{2\{(A - \frac{1}{2}B) + B\}}{C - \{\frac{3}{2}B + 2(A - \frac{1}{2}B)\}}$$

It is found that the copolymer employed in FIG. 2 is an equimolar copolymer of butadiene and ethylene.

(4) In FIG. 2, the spectrum measured in the region from about 7.5τ to 9.0τ and shown shifted upward from the base line is the one measured by a 100 mHz. spectrometer and the other one was measured by a 60 mHz. spectrometer. Intrinsic viscosity of the copolymer employed in FIG. 2 was 2.38 (dl./g.) in toluene at 30° C. and its melting point was observed at 23° C. by DSC measurement. Therefore, on account of its high viscosity, in the 60 mHz. spectrum 8.57τ, 8.62τ and 8.72τ peaks can not be observed, but in the 100 mHz. spectrum these peaks can be seen. These peaks may mainly be ascribed to methylene groups of ethylene units of the copolymer and the shape of the peak (100 mHz.) is quite similar to the one in FIG. 8.

Figure 3:
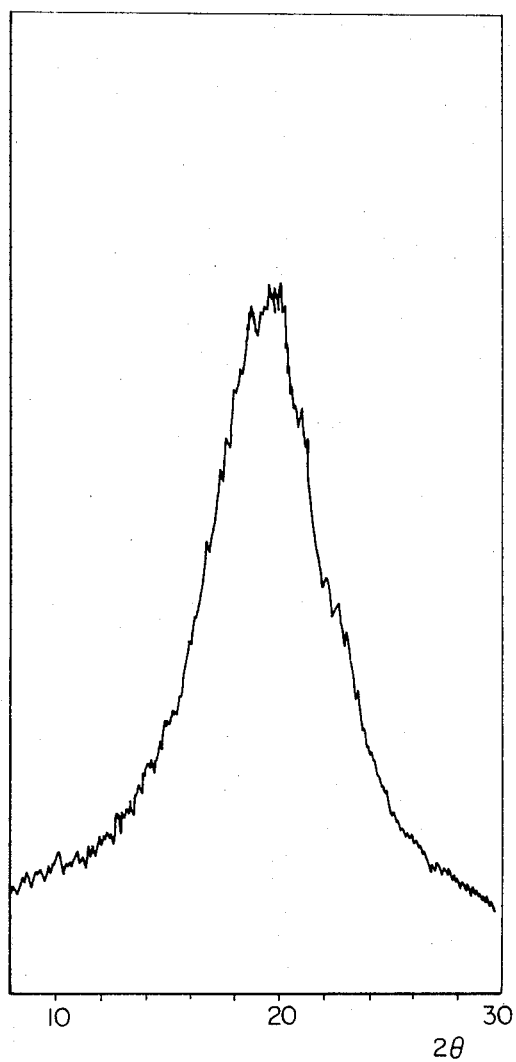
FIG. 3 shows the X-ray diffraction diagram of the copolymer employed in FIG. 1.
Figure 4:
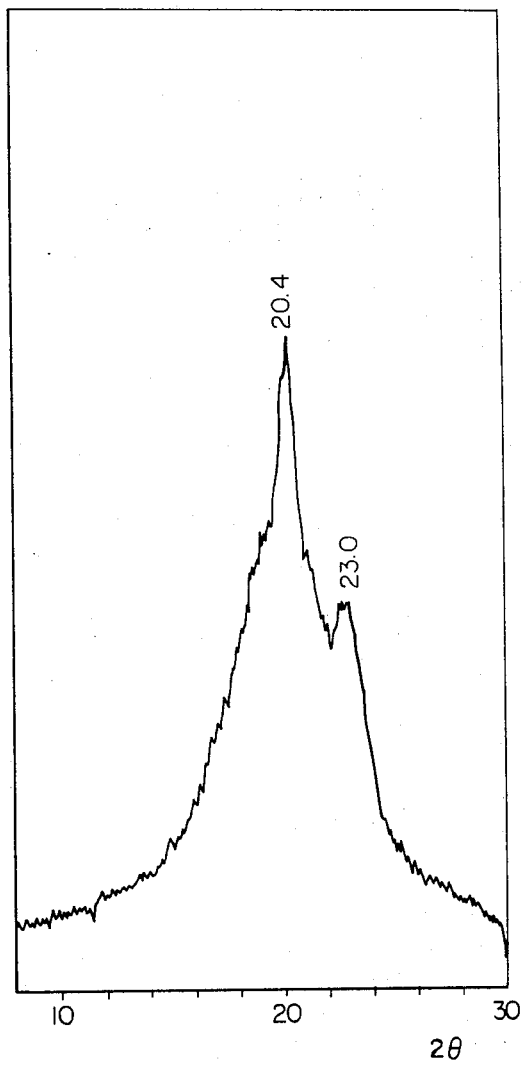
FIG. 4 shows the X-ray diffraction diagram of the copolymer employed in FIG. 1 which was stretched at 25° C.

(5) The X-ray diagram of the copolymer employed in FIG. 1 and FIG. 2 is shown in FIG. 3. It was measured at 25° C. It is found that the copolymer is amorphous at 25° C. However, as can be seen in FIG. 4 on stretching the specimen at 25° C., two peaks appear at 20.4° and 23.0°. The peaks correspond to the ones appearing in the diagram of the copolymer employed in FIG. 7 and FIG. 8.

(6) The copolymerization gives 1:1 copolymer over a wide range of initial monomer composition.

(7) The copolymerization reaction gives 1:1 copolymer independently of polymerization time.

(8) From the above results, it is concluded that the copolymer of the present invention is an alternating copolymer of butadiene and ethylene whose microstructure of butadiene units is composed of trans-1,4, cis-1,4 and 1,2 structures.

The differences between the alternating copolymer of butadiene and ethylene given in this invention and the one given by Natta previously are described below.

Figure 7:
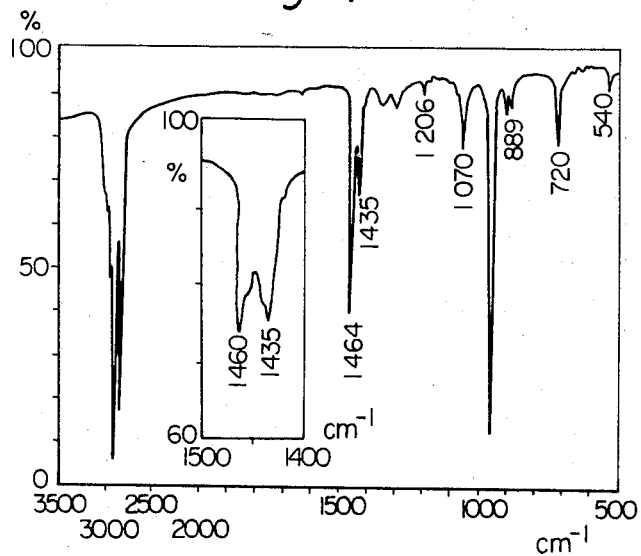
FIG. 7 shows the infrared spectrum of a solid film of a highly crystalline alternating copolymer of butadiene and ethylene on rock salt whose microstructure of butadiene units in the copolymer is essentially trans-1,4 and the spectrum shown in a rectangular circuit is the one measured in tetrachloroethylene solution.
Figure 8:
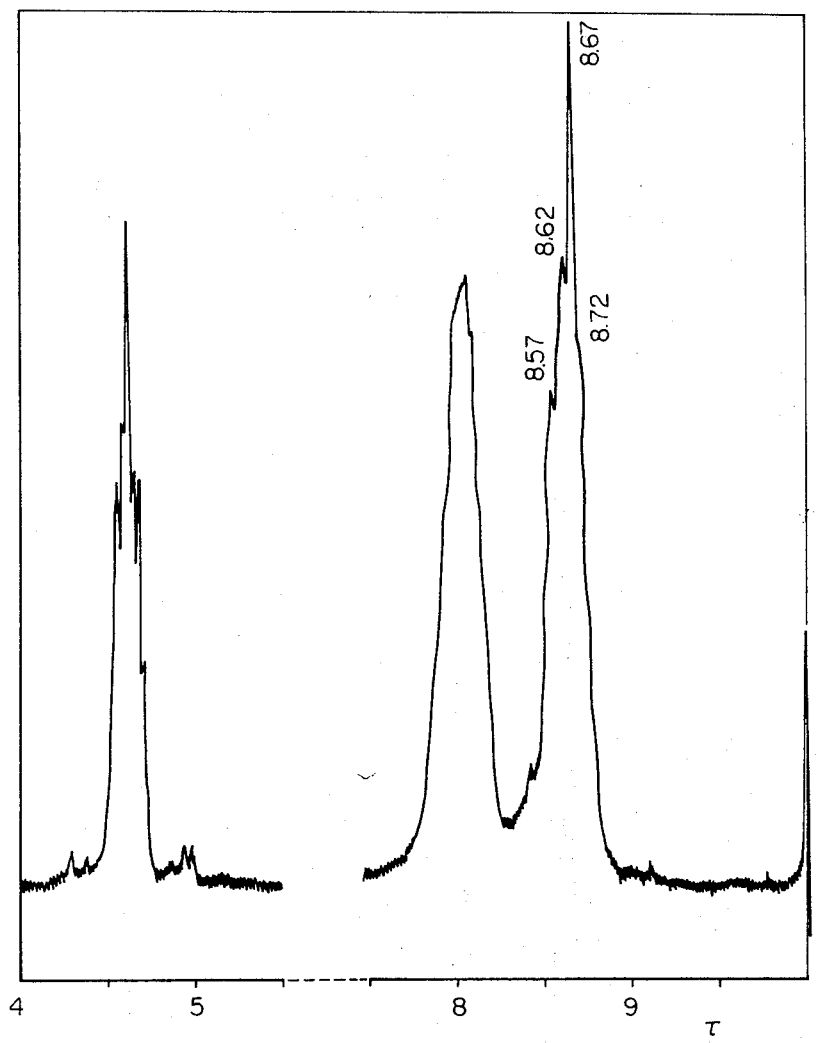
FIG. 8 shows the 60 mHz. nuclear magnetic resonance spectrum of the copolymer employed in FIG. 7.

The copolymer of butadiene and ethylene prepared by the catalyst system of triisobutylaluminum, vanadyl chloride and a partial hydrolysis reaction product of aluminum triisopropoxide (Japanese patent appln. No. 21,996/1970) was employed as the sample of FIG. 7 and FIG. 8. FIGS. 7 and 8 are given for reference purposes. Intrinsic viscosity measured in toluene at 30° C. was 0.39 (dl./g.) and its melting point was clearly observed at 73° C. by DSC measurement. In FIG. 7, cis-butadiene unit can scarcely be found in it and the butadiene unit of the copolymer is found to be essentially trans-1,4. In FIG. 8, it is found that trans-1,4 content of the copolymer is 94.0% and 1,2 content is 6.0%. In FIG. 7, the crystallization sensitive bands at 1206, 1070 and 889 cm.$^{-1}$ reported by Natta are observed. The copolymer was shown to be highly crystalline in the X-ray diagram measured at room temperature and it showed two peaks at angles $2\sigma = 20.4$ and 23.0°. The copolymer is found to be an equimolar copolymer of butadiene and ethylene in FIG. 8.

From the above results, it was concluded that the copolymer employed in FIG. 7 and FIG. 8 is a highly crystalline alternating copolymer of butadiene and ethylene whose butadiene unit is essentially trans-1,4. In other words, the copolymer is quite similar to the alternating copolymer of butadiene and ethylene reported by Natta previously.

When Bt is trans-1,4-butadiene unit, Bc is cis-1,4 butadiene unit, $B_{1,2}$ is 1,2 butadiene unit and E is ethylene unit, the structure of the alternating copolymer of this invention can be illustrated as below:

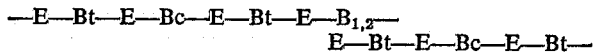

on the other hand, the ultimate structure of the alternating copolymer proposed by Natta can be illustrated as below:

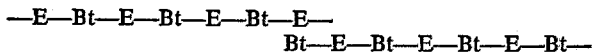

Therefore, the alternating copolymer proposed by Natta is highly crystalline and has a high melting point. The melting point of the copolymer employed in FIG. 7 and FIG. 8 was 73° C. and that of the ones reported by Natta was 60–65° C. As shown above, the microstructure of the butadiene unit of the ultimate structure of the alternating copolymer proposed by Natta is all trans-1,4 and therefore the ultimate melting point of the copolymer should be higher than 73° C.

On the other hand, the microstructure of the butadiene unit of the copolymer of this invention is lacking in stereospecificity and therefore crystallinity and melting point of the copolymer is lower than that of the one proposed by Natta. The copolymer of this invention shows rubber-like elasticity. However, the copolymer proposed by Natta does not show rubber-like elasticity.

Figure 6:
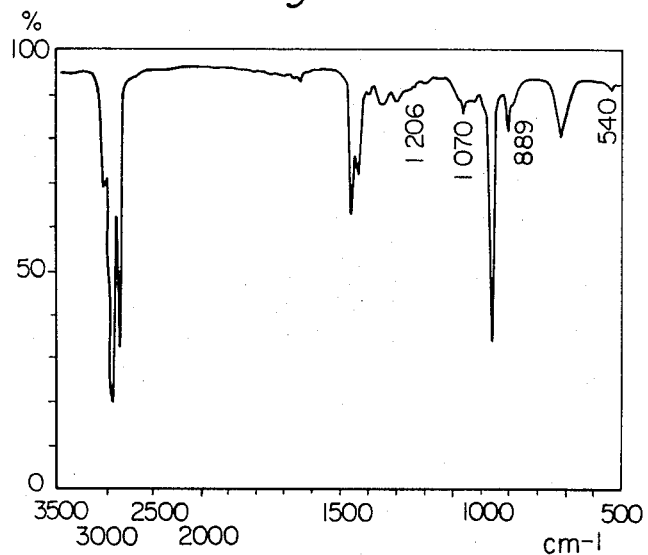
FIG. 6 shows the infrared spectrum of a solid film of an alternating copolymer of butadiene and ethylene of the present invention on rock salt, and the melting point of the copolymer was observed at 32° C. by DSC.

The alternating copolymer of butadiene and ethylene employed in FIG. 6 shows its melting point at 32° C. In FIG. 7, the spectrum shown in the rectangular circuit is the one measured in tetrachloroethylene. Therefore, 1464 cm.$^{-1}$, 1435 cm.$^{-1}$, and 540 cm.$^{-1}$ bands are also considered to be crystallization sensitive bands of the crystalline alternating copolymer. In FIG. 6, these crystallization sensitive bands also appear as a very weak band. On the other hand, from the band shape of the 722 cm.$^{-1}$ band, the existence of cis-1,4 structure is apparent. The copolymer also shows rubber-like elasticity. Therefore, it is found that the crystallinity of the copolymer is higher than that of the one employed in FIG. 1 and FIG. 2, but the structure of the copolymer is similar to the one employed in FIG. 1 and FIG. 2. In FIG. 1, only a trace of 1070 cm.$^{-1}$ band can be seen as a weak and broad band at 1075 cm.$^{-1}$.

Accordingly, it is concluded that the alternating copolymer of this invention corresponds to one obtained by randomly replacing optional amounts of trans-1,4 butadiene units of the alternating copolymer of butadiene and ethylene proposed by Natta with a cis-1,4 butadiene unit and (or) a 1,2 butadiene unit.

By decreasing the stereospecificity of microstructure of the butadiene unit of the alternating copolymer of butadiene and ethylene proposed by Natta, the crystallinity and melting point of the copolymer decreased and by further decreasing the stereospecificity of microstructure of the butadiene unit of the copolymer, an alternating copolymer of butadiene and ethylene whose microstructure of the butadiene units is random can be obtained. The copolymer shows no melting point, shows no X-ray crystallinity and is amorphous even on stretching or on cooling. It is noteworthy that the distribution of butadiene unit and ethylene units of the copolymer is quite regular and only microstructure of the butadiene units of the copolymer is random. And therefore, the copolymer is quite different from an amorphous equimolar random copolymer of butadiene and ethylene whose units of the two comonomers in the copolymer have random distribution.

It is concluded that the structure of the alternating copolymer of butadiene and ethylene of this invention is quite different from that of the one proposed by Natta previously.

The alternating copolymer of butadiene and ethylene proposed by Miyoshi showed its melting point at 60° C. and therefore, the copolymer is quite similar to the one proposed by Natta. The alternate copolymer of ethylene and butadiene of this invention shows a melting point of lower than 55° C. or shows no melting point.

The following results support the conclusion that the copolymer of isoprene and ethylene prepared by the method of the present invention is an alternating copolymer of isoprene and ethylene.

Figure 9:
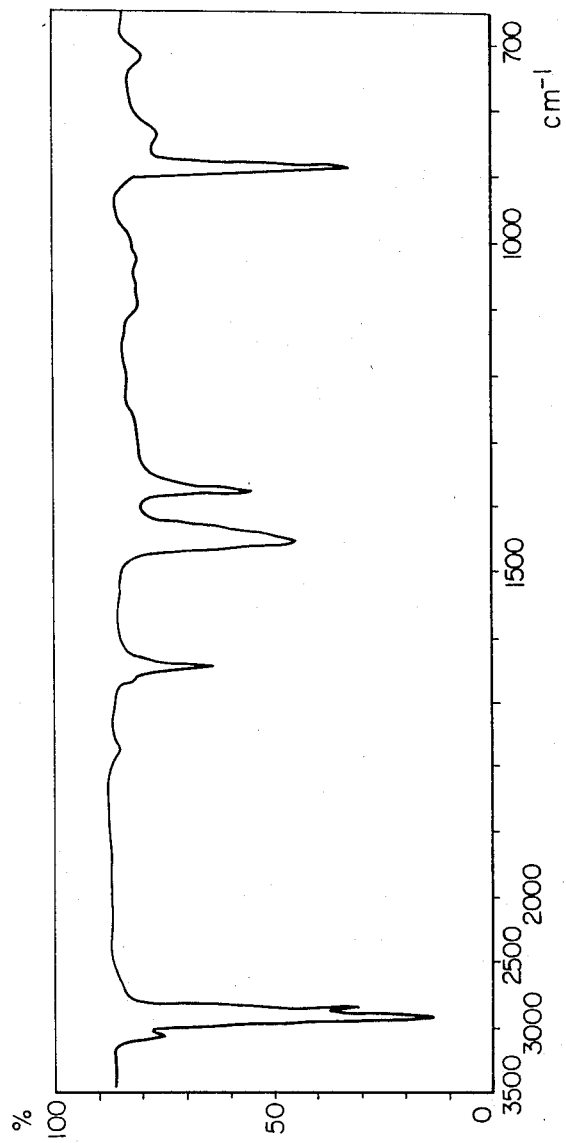
FIG. 9 shows the infrared spectrum of a solid film of an alternating copolymer of isoprene and ethylene of the present invention on rock salt.

(1) In FIG. 9, it is found that microstructure of the isoprene units of the copolymer is substantially composed of 1,4-structure and 3,4-structure. There can be seen no peak near 909 cm.$^{-1}$ which corresponds to a band assigned to 1,2-structure of an isoprene unit. The 890 cm.$^{-1}$ band and broad 840 cm.$^{-1}$ band are assigned to 3,4- and 1,4-structures of a isoprene unit of the copolymer, respectively.

Figure 10:
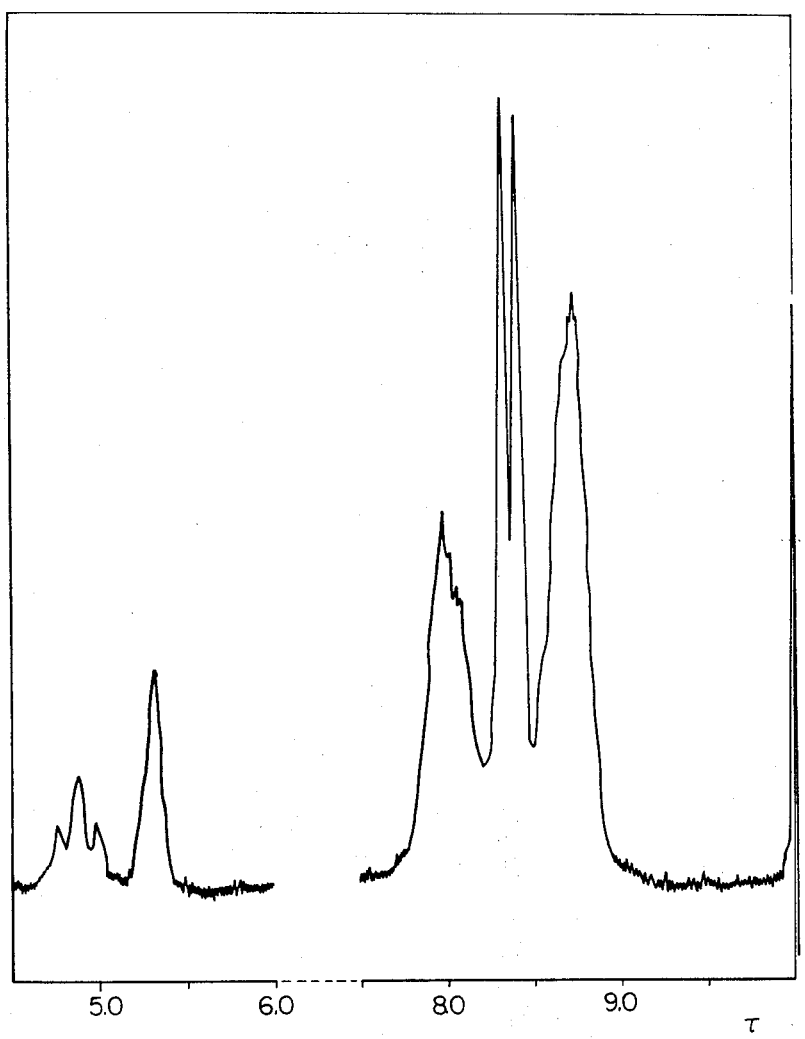
FIG. 10 shows the 60 mHz. nuclear magnetic resonance spectrum of the copolymer employed in FIG. 9.

(2) In FIG. 10, the triplet at 4.9τ is ascribed to the proton directly attached to a 1,4-isoprene double bond and the peak at 5.32τ is ascribed to a isopropenyl methylene group of a 3,4-isoprene unit of the copolymer. By measuring the ratio of peak area of the triplet at 4.9τ to half of that of the peak at 5.32τ, the ratio of 1,4-structure to 3,4-structure is found to be 63/37.

(3) Copolymer compositions were determined as follows: if A is peak area of the triplet at 4.9τ, B is peak area of the peak at 5.32τ, and C is peak area of the all peaks in the region from 7.5τ to 9.5τ, the molar ratio of isoprene to ethylene in the copolymer can be shown by the following equation:

$$\frac{\text{isoprene}}{\text{ethylene}} = \frac{A + \frac{1}{2}B}{\{C - (7A + 3B)\}\frac{1}{4}}$$

It is found that the composition of the copolymer according to the NMR analysis substantially agrees well with the calculated value for the 1:1 copolymer of isoprene and ethylene.

(4) The copolymerization reaction gives 1:1 copolymer over a wide range of initial monomer composition.

(5) The copolymerization reaction gives 1:1 copolymer independently of polymerization time.

(6) In FIG. 10, the $8.32\tau$ peak may be ascribed to a methyl group of cis-1,4-structure of an isoprene unit and the $8.42\tau$ peak may be ascribed to the total of methyl groups of trans-1,4- and 3,4-structures of isoprene units of the copolymer. Therefore, it is found that cis-1,4 content of the copolymer is higher than trans-1,4 content.

As far as the inventors know, there is no prior art in connection with an alternating copolymer of isoprene and ethylene nor of a process for its preparation.

The alternating copolymer of a conjugated diene and ethylene whose microstructure of conjugated diene units is lacking in stereospecificity given by the present invention is concluded to be a novel material.

were held in a low temperature bath at $-78°$ C. and varying amounts of an organoaluminum compound solution in toluene (1 molar solution), 10.0 milliliters of liquid butadiene and varying amounts of ethylene were put successively into the vessels also employing the usual, dry, air-free technique. Thereafter, the vessels were sealed and allowed to copolymerize at a predetermined temperature for 16 hours. The results were summarized in Table 1.

Methylisobutyl ketone insoluble and pentane soluble fraction was collected as an alternating copolymer of butadiene and ethylene. The infrared spectra and NMR spectra of these fractions listed in Table 1 were similar to those in FIG. 1 and FIG. 2, respectively. Pentane insoluble fraction was ethylene rich random copolymer of ethylene and butadiene and the NMR spectra of these fractions were similar to the one in FIG. 5.

TABLE 1 (1)

| Experiment number: | Catalysts[1] | | | | | | Monomer, liquid butadiene (ml.) |
|---|---|---|---|---|---|---|---|
| | Organo-aluminum compound | Mmol | TiX$_4$ | Mmol | Carbonyl compound | Mmol | |
| 1 | AliBu$_3$ | 0.50 | TiCl$_4$ | 0.05 | Isobutyric acid anhydride | 0.125 | 10.0 |
| 2 | AliBu$_3$ | 0.50 | TiCl$_4$ | 0.05 | Acetic acid | 0.125 | 10.0 |
| 3 | AliBu$_3$ | 0.50 | TiCl$_4$ | 0.05 | Acetone | 0.125 | 10.0 |
| 4 | AliBu$_3$ | 1.00 | TiCl$_4$ | 0.10 | Propionic acid anhydride | 0.25 | 10.0 |
| 5 | AliBu$_3$ | 0.15 | TiCl$_4$ | 0.10 | Benzophenone | 0.05 | 10.0 |
| 6 | AliBu$_3$ | 0.50 | TiBr$_4$ | 0.10 | Isobutyl aldehyde | 0.10 | 10.0 |
| 7 | AliBu$_3$ | 0.50 | TiBr$_4$ | 0.10 | Acetyl acetone | 0.10 | 10.0 |
| 8 | AliBu$_3$ | 1.00 | TiBr$_4$ | 0.10 | Benzoyl peroxide | 0.25 | 10.0 |
| 9 | AlEt$_3$ | 0.50 | TiBr$_4$ | 0.10 | Isoamyl acetate | 0.15 | 10.0 |
| 10 | AlEt$_3$ | 0.50 | TiBr$_4$ | 0.10 | Acetic acid anhydride | 0.10 | 10.0 |
| 11 | AlEt$_3$ | 1.00 | TiCl$_4$ | 0.10 | Diethylmalonate | 0.25 | 10.0 |

[1] AliBu$_3$=triisobutylaluminum; AlEt$_3$=triethylaluminum.

TABLE 1 (2)

| Experiment number: | Polymerization conditions | | | Copolymer yield, grams | |
|---|---|---|---|---|---|
| | Monomer, ethylene (g.) | Temperature (° C.) | Time (hr.) | Methyl isobutyl ketone insoluble, pentane soluble fraction (alternating copolymer) | Pentane insoluble fraction (butadiene ethylene random copolymer) |
| 1 | 6.0 | −30 | 16 | 0.40 | 1.65 |
| 2 | 6.0 | −30 | 16 | 0.47 | 3.17 |
| 3 | 6.0 | −30 | 16 | 0.14 | 0.92 |
| 4 | 7.0 | −30 | 18 | 0.68 | 1.29 |
| 5 | 7.0 | 0 | 18 | 0.05 | 3.86 |
| 6 | 7.0 | 0 | 18 | 0.33 | 6.94 |
| 7 | 7.0 | 0 | 18 | 0.11 | 3.55 |
| 8 | 7.0 | −30 | 16 | 0.09 | 0.87 |
| 9 | 6.0 | 0 | 16 | 0.64 | 2.58 |
| 10 | 6.0 | 0 | 16 | 0.45 | 3.69 |
| 11 | 6.0 | 0 | 16 | 0.02 | 4.29 |

Figure 5:
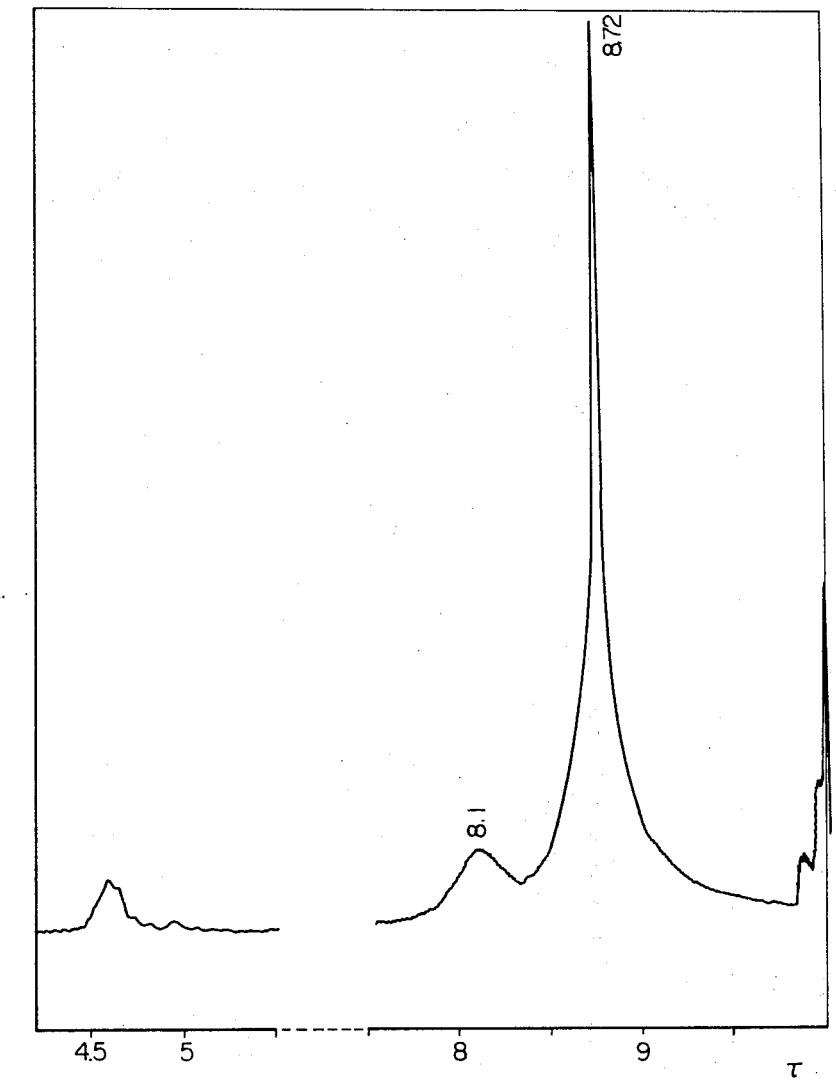
FIG. 5 shows the 60 mHz. nuclear resonance spectrum of an ethylene rich random copolymer of butadiene and ethylene of the present invention.

The molar ratio of conjugated diene to ethylene in the ethylene rich random copolymer of a conjugated diene and ethylene of the present invention is lower than ¼ (diene/ethylene<¼). In FIG. 5, there are observed no butadiene-butadiene repeating units. It is found that the copolymer is a crystalline polyethylene modified by 10 mol percent butadiene units which are randomly distributed in the polymer main chain.

The invention will be illustrated with reference to the following examples.

EXAMPLE 1

The usual, dry, air-free technique was employed and 5.0 milliliters of toluene, varying amounts of titanium (IV) halide solution in toluene (1 molar solution) and varying amounts of carbonyl group containing compound were put successively into 30 milliliter stainless steel reaction vessels at 25° C. Then, the vessels were left alone at 25° C. for 10 minutes. Thereafter, the vessels

EXAMPLE 2

The usual, dry, air-free technique was employed and 5.0 milliliters of toluene, 0.10 milliliter of titanium (IV) chloride solution in toluene (1 molar solution) and 0.05 g. of carbonyl group containing compound were put successively into 30 milliliter stainless steel reaction vessels at 25° C. Then, the vessels were left alone at 25° C. for 10 minutes. Thereafter, the vessels were held in a low temperature bath at −78° C. and varying amounts of triisobutylaluminum solution in toluene (1 molar solution), 10.0 milliliters liquid butadiene and 7.0 g. ethylene were put successively into the vessels also employing the usual, dry, air-free technique. Thereafter, the vessels were sealed and allowed to copolymerize at 0° C. for 18 hours. The results were summarized in Table 2. The structure of the alternating copolymers and that of the random copolymers of butadiene and ethylene were similar to the ones in Example 1, respectively.

TABLE 2 (1)

| Experiment number | Catalyst | | | | | Monomer, Liquid butadiene (ml.) |
|---|---|---|---|---|---|---|
| | Organo-aluminum compound | Mmol | TiX₄ | Mmol | Carbonyl compound | Gram | |
| 1 | AlIBu₃ | 1.00 | TiCl₄ | 0.10 | Al(OCCH₃)₃ (O=C) | 0.05 | 10.0 |
| 2 | AlIBu₃ | 1.00 | TiCl₄ | 0.10 | Zn(OCCH₃)₂ (O=C) | 0.05 | 7.0 |
| 3 | AlIBu₃ | 0.50 | TiCl₄ | 0.10 | OV(OCCH₃)₂ (O=C) | 0.05 | 10.0 |
| 4 | AlIBu₃ | 1.00 | TiCl₄ | 0.10 | OTi(acac)₂ | 0.05 | 10.0 |

¹ AlIBu₃=triisobutylaluminum; AlEt₃=triethylaluminum; OTi(acac)₂=titanium oxydiacetylacetonate.

TABLE 2 (2)

| | Monomer, ethylene (g.) | Polymerization conditions | | Copolymer yield, grams | |
|---|---|---|---|---|---|
| | | Temperature (°C.) | Time (hr.) | Methyl isobutyl ketone insoluble, pentane soluble fraction (alternating copolymer) | Pentane insoluble fraction (butadiene ethylene random copolymer) |
| Experiment number: | | | | | |
| 1 | 7.0 | 0 | 18 | 0.22 | 5.83 |
| 2 | 7.0 | 0 | 18 | 0.13 | 4.00 |
| 3 | 7.0 | 0 | 18 | 0.23 | 6.25 |
| 4 | 7.0 | 0 | 18 | 0.13 | 3.66 |

EXAMPLE 3

The usual, dry, air-free technique was employed and 5.0 milliliters of toluene and varying amounts of titanium (IV) halide solution in toluene (1 molar solution) were put into 30 milliliter stainless steel reaction vessels at 25° C. Then, the vessels were held in a low temperature bath at −78° C. and varying amounts of an organoaluminum compound solution in toluene (1 molar solution), varying amounts of liquid butadiene and varying amounts of ethylene were put successively into the vessels also employing the usual, dry, air-free technique. Thereafter, the vessels were sealed and allowed to copolymerize at a predetermined temperature and for a predetermined time. The results were summarized in Table 3. In the infrared spectra of the alternating copolymers in Table 3, as shown in FIG. 6, a weak and sharp 1070 cm.⁻¹ band appeared, respectively.

TABLE 3 (1)

| Experiment number | Catalyst¹ | | | | Monomers | |
|---|---|---|---|---|---|---|
| | Organo-aluminum compound | Mmol | TiX₄ | Mmol | Liquid butadiene (ml.) | Ethylene (g.) |
| 1 | AlIBu₃ | 0.50 | TiCl₄ | 0.05 | 10.0 | 6.0 |
| 2 | AlIBu₃ | 0.15 | TiCl₄ | 0.10 | 10.0 | 7.0 |
| 3 | AlIBu₃ | 1.00 | TiBr₄ | 0.10 | 10.0 | 7.0 |
| 4 | AlEt₃ | 1.00 | TiCl₄ | 0.10 | 10.0 | 7.0 |
| 5 | AlEt₃ | 1.00 | TiCl₄ | 0.10 | 6.0 | 1.0 |
| 6 | AlEt₃ | 1.00 | TiCl₄ | 0.40 | 6.0 | 3.0 |

TABLE 3 (2)

| Experiment number | Polymerization conditions | | Copolymer yield, grams | |
|---|---|---|---|---|
| | Temperature (°C.) | Time (hr.) | Methyl isobutyl ketone insoluble, pentane soluble fraction (alternating copolymer) | Pentane insoluble fraction (butadiene-ethylene random copolymer) |
| 1 | −30 | 16 | 0.03 | 0.65 |
| 2 | 0 | 18 | 0.02 | 7.68 |
| 3 | 0 | 18 | 0.05 | 8.10 |
| 4 | 0 | 18 | Trace | 1.78 |
| 5 | 20 | 20 | Trace | 2.66 |
| 6 | −20 | 19 | 0.10 | 3.04 |

¹ AlIBu₃=triisobutylaluminum; AlEt₃=triethylaluminum.

EXAMPLE 4

The usual, dry, air-free technique was employed and varying amounts of toluene, varying amounts of carbonyl compound and varying amounts of titanium (IV) chloride solution in toluene (1 molar solution) were put successively into 30 milliliter stainless steel reaction vessels at 25° C. Then, the vessels were held in a constant temperature bath maintained at a predetermined temperature (it corresponds to catalyst preparation temperature in Table 4 listed below) and varying amounts of triisobutylaluminum solution in toluene (1 molar solution)

were put into the vessels respectively. Thereafter, the bottles were held in a low temperature bath at −78° C. and varying amounts of liquid butadiene and varying amounts of ethylene were put successively into the vessels also employing the usual, dry, air-free technique. Thereafter, the vessels were sealed and allowed to copolymerize at a predetermined temperature for 18 hours. The results were summarized in Table 4. The structure of the alternating copolymer and that of the random copolymers of butadiene and ethylene were similar to those in Example 1, respectively.

The structure of the copolymer was similar to the one shown in Example 1. Chloroform insoluble fraction was ethylene rich random copolymer of butadiene and ethylene. Butadiene content of the copolymer was 6.2 mol percent. The yield of the copolymer was 4.39 g.

EXAMPLE 6

The usual, dry, air-free technique was employed and 5.0 milliliters of toluene, 0.10 milliliter of titanium (IV) halide solution in toluene (1 molar solution) and 0.25

TABLE 4 (1)

| Experiment number: | Catalysts | | | | Catalyst preparation temperature (° C.) | Solvent, toluene (ml.) | Monomers | |
|---|---|---|---|---|---|---|---|---|
| | AliBu₃, Mmol | TiCl₄, Mmol | Carbonyl compound | Mmol | | | Liquid butadiene (ml.) | Ethylene (g.) |
| 1 | 0.60 | 0.20 | Acetone | 0.01 | 0 | 5.0 | 10.0 | 2.0 |
| 2 | 1.00 | 0.10 | Acetic acid | 0.70 | −78 | 5.0 | 10.0 | 8.0 |
| 3 | 0.50 | 0.05 | TiCl(OCC₂H₅)₃ | 0.10 | −78 | 10.0 | 10.0 | 0.5 |
| 4 | 2.50 | 0.05 | Propionic acid anhydride | 0.10 | −78 | 5.0 | 10.0 | 2.0 |
| 5 | 0.30 | 10.10 | Acetophenone | 0.10 | −78 | 15.0 | 2.0 | 8.0 |

TABLE 4 (2)

| | Polymerization conditions | | Copolymer | | | |
|---|---|---|---|---|---|---|
| | | | Methyl ethyl ketone insoluble, chloroform soluble fraction (alternating copolymer) | | | Chloroform insoluble fraction (butadiene ethylene random copolymer) (g.) |
| | Temperature (° C.) | Time (hr.) | Yield (g.) | Butadiene microstructure | | |
| | | | | 1,2 | 1,4 | |
| | | | | Percent | | |
| Experiment number: | | | | | | |
| 1 | 0 | 18 | 0.58 | 9 | 91 | 0.20 |
| 2 | −40 | 18 | 0.01 | 15 | 85 | 0.38 |
| 3 | −40 | 18 | 0.06 | 13 | 87 | Trace |
| 4 | 0 | 18 | 0.14 | 15 | 85 | 0.10 |
| 5 | −40 | 18 | 0.15 | 13 | 87 | 4.75 |

EXAMPLE 5

The usual, dry, air-free technique was employed and 10.0 milliliters of toluene, 0.10 millimole of benzophenone, 0.10 milliliter of titanium (IV) chloride solution in toluene (1 molar solution) and 0.30 milliliter of triisobutylaluminum solution in toluene (1 molar solution) were put successively into a 30 milliliter stainless steel reaction vessel at 20° C. Then, the vessel was held in a low temperature bath at −78° C. and 10.0 milliliters of liquid butadiene and 8.0 g. of ethylene were put into the vessel also employing the usual, dry, air-free technique. Thereafter, the vessel was sealed and allowed to copolymerize at 20° C. for 5 hours. Yield of the methyl ethyl ketone insoluble and chloroform soluble fraction, i.e. alternating copolymer of butadiene and ethylene was 1.49 g. Its intrinsic viscosity was 1.2 (dl./g.) in chloroform at 30° C. The microstructure of butadiene unit of the copolymer was as follows:

|  | Percent |
|---|---|
| 1,2 | 12 |
| 1,4 | 88 | millimole of carbonyl group containing compound were put successively into 30 milliliter stainless steel reaction vessels at 25° C. Then, the vessels were left alone at 25° C. for 10 hours. Thereafter, the vessels were held in a low temperature bath at −78° C. and 1.00 milliliter of triisobutylaluminum solution in toluene (1 molar solution), 5.0 milliliters of liquid isoprene and 8.0 g. of ethylene were put into the vessels also employing the usual, dry, air-free technique. Thereafter, the vessels were sealed and allowed to copolymerize at 0° C. for 24 hours. The results were summarized in Table 5. Methyl ethyl ketone insoluble and chloroform soluble fraction was gathered as an alternating copolymer of isoprene and ethylene. The infrared spectra and NMR spectra of the alternating copolymers in Table 5 were similar to those in FIG. 9 and FIG. 10, respectively. The chloroform insoluble fractions were found to be random copolymers of isoprene and ethylene whose isoprene contents were 1–3 mol percent from their NMR spectra.

TABLE 5 (1)

| | Catalysts | | | | | Monomers | |
|---|---|---|---|---|---|---|---|
| | Organoaluminum compound | Mmol | TiX₄ | Mmol | Carbonyl compound | Mmol | Liquid isoprene (ml.) | Ethylene (g.) |
| Experiment number: | | | | | | | | |
| 1 | AliBu₃ | 1.00 | TiCl₄ | 0.10 | Propionic acid anhydride | 0.25 | 5.0 | 8.0 |
| 2 | AlEt₃ | 1.00 | TiCl₄ | 0.10 | Acetic acid | 0.25 | 5.0 | 8.0 |
| 3 | AlEt₃ | 1.00 | TiCl₄ | 0.10 | Isobutyl aldehyde | 0.25 | 5.0 | 8.0 |
| 4 | AliBu₃ | 1.00 | TiCl₄ | 0.10 | Isoamyl acetate | 0.25 | 5.0 | 8.0 |
| 5 | AliBu₃ | 1.00 | TiBr₄ | 0.10 | Isobutyric acid anhydride | 0.25 | 5.0 | 8.0 |
| 6 | AliBu₃ | 1.00 | TiBr₄ | 0.10 | Benzophenone | 0.25 | 5.0 | 8.0 |

TABLE 5 (2)

| | Polymerization conditions | | Copolymer | | | |
|---|---|---|---|---|---|---|
| | | | Methyl ethyl ketone insoluble, chloroform soluble fraction (alternating copolymer) | | | Chloroform insoluble fraction (isoprene-ethylene random copolymer) (g.) |
| | Temperature (° C.) | Time (hr.) | Yield (g.) | Isoprene microstructure | | |
| | | | | 1,4 | 3,4 | |
| | | | | Percent | | |
| Experiment number: | | | | | | |
| 1 | 0 | 24 | 0.77 | 63 | 37 | 0.81 |
| 2 | 0 | 24 | 0.89 | 58 | 42 | 7.69 |
| 3 | 0 | 24 | 0.79 | | | 7.53 |
| 4 | 0 | 24 | 0.45 | | | 5.66 |
| 5 | 0 | 24 | 2.29 | 60 | 40 | 7.41 |
| 6 | 0 | 24 | 1.33 | | | 7.00 |

EXAMPLE 7

The usual, dry, air-free technique was employed and 5.0 milliliters of toluene and 0.10 milliliter of titanium (IV) chloride solution in toluene (1 molar solution) were put into 30 milliliter stainless steel reaction vessels at 25° C. Then, the vessels were held in a low temperature bath at −78° C. and varying amounts of organo-aluminum compound solution in toluene (1 molar solution), 5.0 milliliters of liquid isoprene and 8.0 g. of ethylene were put successively into the vessels also employing the usual, dry, air-free technique. Thereafter, the vessels were sealed and allowed to copolymerize at a predetermined temperature and for a predetermined time. The results were summarized in Table 6.

TABLE 6 (1)

| | Catalyst | | | Monomers | | Polymerization conditions | |
|---|---|---|---|---|---|---|---|
| | Organoaluminum compound | Mmol | TiCl₄, Mmol | Liquid isoprene (ml.) | Ethylene (g.) | Temperature (° C.) | Time (hr.) |
| Experiment number: | | | | | | | |
| 1 | AliBu₃ | 0.25 | 0.10 | 5.0 | 8.0 | −30 | 16 |
| 2 | AliBu₃ | 1.00 | 0.10 | 5.0 | 8.0 | 0 | 24 |
| 3 | AlEt₃ | 0.25 | 0.10 | 5.0 | 8.0 | 0 | 17 |

TABLE 6 (2)

| | Copolymer yield, grams | |
|---|---|---|
| | Methyl ethyl ketone insoluble, chloroform soluble fraction (alternating copolymer) | Chloroform insoluble fraction (isoprene-ethylene random copolymer) |
| Experiment number: | | |
| 1 | 0.04 | 2.02 |
| 2 | 0.05 | 3.44 |
| 3 | 0.01 | 7.81 |

EXAMPLE 8

The usual, dry, air-free technique was employed and 10.0 milliliters of toluene, 0.10 millimole

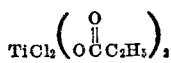

0.10 milliliter of titanium (IV) chloride solution in toluene (1 molar solution), 0.80 milliliter of triisobutylaluminum solution in toluene (1 molar solution), 10.0 milliliters of liquid isoprene and 8.0 g. of ethylene were put successively into a 30 milliliter stainless steel reaction vessel at −78° C. Then, the vessel was sealed and allowed to copolymerize at 20° C. for 5 hours. The yield of alternating copolymer of isoprene and ethylene insoluble in methyl ethyl ketone and soluble in chloroform was 2.40 g. The microstructure of isoprene units of the alternating copolymer was as follows:

| | Percent |
|---|---|
| 1,4 | 64 |
| 3,4 | 36 |

The yield of chloroform insoluble fraction i.e. random copolymer of isoprene and ethylene was 5.88 g. Isoprene content of the copolymer was found to be 3 mol percent from its NMR analysis.

EXAMPLE 9

The usual, dry, air-free technique was employed and 10.0 milliliters of toluene, 0.20 millimole of benzophenone, 0.20 milliliter of titanium (IV) chloride solution in toluene (1 molar solution), 1.00 milliliter of triisobutyl-aluminum solution in toluene (1 molar solution), 10.0 milliliters of liquid isoprene and 4.0 g. of ethylene were put successively into a 30 milliliters stainless steel reaction vessel at −78° C. Then, the bottle was sealed and allowed to copolymerize at 0° C. for 5 hours. The yield of alternating copolymer of isoprene and ethylene insoluble in methyl ethyl ketone and soluble in chloroform was 1.39 g. The microstructure of isoprene units of the alternating copolymer was as follows:

| | Percent |
|---|---|
| 1,4 | 59 |
| 3,4 | 41 |

We claim:
1. A process for preparing a polymerization product selected from the group consisting of a 1:1 alternating copolymer of a conjugated diene and ethylene having rubber-like eleasticity, the microstructure of the conjugated diene of which copolymer is lacking in stereospecificity, and a mixture of said alternating copolymer and an ethylene rich random copolymer of ethylene and said conjugated diene, comprising contacting ethylene and the conjugated diene in liquid phase with a catalyst consisting essentially of an organoaluminum compound having the formula AlR₃ wherein R represents a C₁–C₁₂ hydrocarbon radical selected from the group consisting of alkyl, cycloalkyl, aryl and aralkyl radicals and a titanium tetrahalide, wherein the molar ratio of the organoaluminum compound to the titanium tetrahalide is from 1.5 to 50.

2. A process as claimed in claim 1 wherein a carbonyl group containing compound is further included as a component of the catalyst.

3. A process as claimed in claim 2 wherein the molar ratio of the carbonyl group containing compound to the titanium tetrahalide is within a range from 0.01 to 20.

4. A process as claimed in claim 1 wherein the conjugated diene has from 4 to 12 carbon atoms in the molecule.

5. A process as claimed in claim 4 wherein the conjugated diene has from 4 to 5 carbon atoms in the molecule.

6. A process as claimed in claim 1 wherein the organoaluminum compound is triethylaluminum or triisobutylaluminum.

7. A process as claimed in claim 1 wherein the catalyst is prepared at a temperature within a range from $-100°$ C. to $+100°$ C.

8. A process as claimed in claim 1 wherein the copolymerization is carried out at a temperature within a range from $-100°$ C. to $+100°$ C.

9. A process as claimed in claim 1 wherein the copolymerization is conducted in the form of solution polymerization by using an inert organic solvent.

10. A process as claimed in claim 9 wherein the solvent is selected from the group consisting of an aromatic hydrocarbon, an aliphatic hydrocarbon and a halogenated hydrocarbon.

11. A process as claimed in claim 1, wherein said conjugated diene has from 4 to 5 carbon atoms in the molecule, R is a $C_2$-$C_4$ alkyl radical, both of the temperatures for catalyst preparation and for copolymerization are within a range from $-78°$ C. to $+50°$ C., and the coplymerization is carried out in the form of solution polymerization by using a diluent selected from the group consisting of an aromatic hydrocarbon, an aliphatic hydrocarbon and a halogenated hydrocarbon.

12. A process as claimed in claim 11 wherein a carbonyl group containing compound is further included as a component of the catalyst in an amount to give a molar ratio of the carbonyl group containing compound to the titanium tetrahalide within a range from 0.02 to 10.

13. The process of claim 1, wherein the polymerization product is said 1:1 alternating copolymer.

14. The process of claim 1, wherein the polymerization product is said mixture of said alternating copolymer and said random copolymer.

15. A 1:1 alternating copolymer of ethylene and a conjugated diene having rubber-like elasticity, the microstructure of the conjugated diene units of which copolymer is lacking in sterospecificity.

16. An alternating copolymer as claimed in claim 15 wherein said conjugated diene has from 4 to 12 carbon atoms in the molecule.

17. An alternating copolymer as claimed in claim 15 wherein said conjugated diene is butadiene or isoprene.

18. An alternating copolymer as claimed in claim 17 wherein the conjugated diene is butadiene and the melting point of the copolymer is lower than 55° C.

19. An alternating copolymer as claimed in claim 17 wherein the conjugated diene is butadiene and said copolymer shows no melting point.

References Cited
UNITED STATES PATENTS

| | | | |
|---|---|---|---|
| 2,968,650 | 1/1961 | Baxter et al. | 260—85.3 |
| 3,163,611 | 12/1964 | Anderson et al. | 252—429 |
| 3,590,024 | 6/1971 | Ishizuka et al. | 260—85.3 R |
| 3,657,208 | 4/1972 | Judy | 260—93.1 |

OTHER REFERENCES

Reich and Schindler: Polymerization by Organometallic Compounds, Interscience, New York (1968), pp. 686–8.

JOSEPH L. SCHOFER, Primary Examiner
A. HOLLER, Assistant Examiner